United States Patent [19]

Beer et al.

[11] Patent Number: 5,230,944
[45] Date of Patent: Jul. 27, 1993

[54] LAMINATED MATERIAL HAVING LATENT INHERENT DELAMINATION POTENTIAL

[75] Inventors: Ekkehard Beer, Bad Schwalbach; John D. Gribbin, Schlangenbad; Guenter Krause, Hofheim-Wallau; Tobias Rentzsch, Oberursel, all of Fed. Rep. of Germany

[73] Assignee: Hoechst Aktiengesellschaft, Frankfurt am Main, Fed. Rep. of Germany

[21] Appl. No.: 787,097

[22] Filed: Nov. 4, 1991

[30] Foreign Application Priority Data

Jun. 22, 1991 [DE] Fed. Rep. of Germany ....... 4120685

[51] Int. Cl.$^5$ ................................................ B32B 9/00
[52] U.S. Cl. .................................. 428/195; 428/40; 428/355; 428/411.1; 428/507; 428/511; 428/515; 428/537.5; 428/537.7; 428/913
[58] Field of Search .......... 428/40, 355, 537.5, 428/537.7, 411.1, 913, 507, 511, 515, 195

[56] References Cited

U.S. PATENT DOCUMENTS

3,762,987 10/1973 Maruta ................................ 428/40
3,855,050 10/1974 George ................................ 161/165
5,073,455 12/1991 Nose .................................... 428/355

FOREIGN PATENT DOCUMENTS

0010171 4/1980 European Pat. Off. .
63-202409 8/1988 Japan .
2082217 3/1982 United Kingdom .

OTHER PUBLICATIONS

Odian, Principles of Polymerization, 2nd ed, Wiley-Interscience: New York, 1981. pp. 10–12.

Primary Examiner—Patrick J. Ryan
Assistant Examiner—Marie R. Macholl
Attorney, Agent, or Firm—Foley & Lardner

[57] ABSTRACT

A laminated material having a latent inherent delamination potential which contains at least one layer comprising a thermoplastic, wherein the thermoplastic carries, at least on one side, a release layer of water-soluble or water-dispersible organic material. The material can be delaminated by a process of chopping the material and treating the material with water or steam. The laminated material is useful as, for example, a packaging material. The material can easily be delaminated into its individual layers, thus facilitating recycling of the materials.

19 Claims, 1 Drawing Sheet

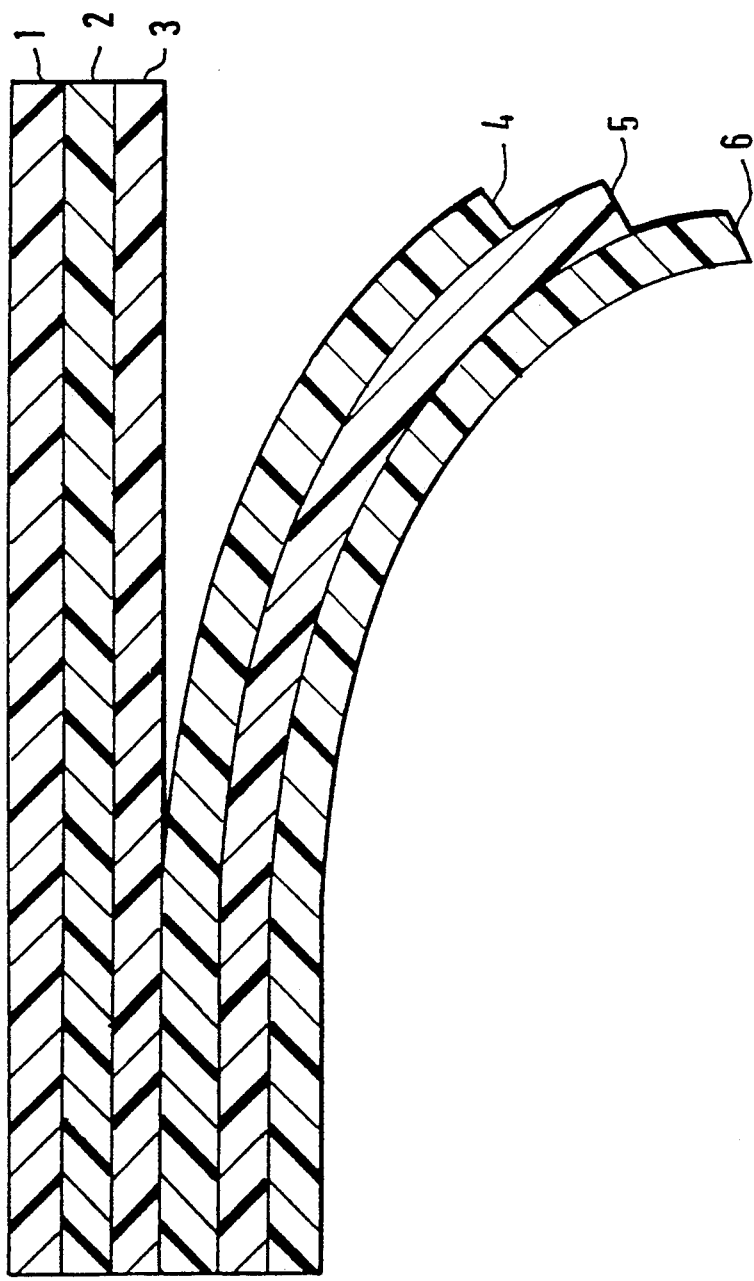

LAMINATED MATERIAL HAVING LATENT INHERENT DELAMINATION POTENTIAL

BACKGROUND OF THE INVENTION

The present invention relates to a laminated material containing at least one layer of a thermoplastic, wherein the laminated material has latent inherent delamination potential, and to a process for carrying out the delamination.

Thermoplastics are used in industry for a very wide range of purposes. Particularly, thermoplastics are used frequently and in an extremely large amount in the direct and indirect packaging sector for various purposes, because they have advantageous mechanical and physical properties, because they can be readily molded by automatic processing machines, and especially because they can easily be given a visual image by coloring, printing, and/or metallization. The visual image is appealing in a particularly pleasant manner to people's aesthetic sensitivity and creates the impression of high quality for the end users in accordance with the intention of the manufacturers and suppliers.

Owing to the extremely extensive use of such thermoplastics, the manufacturers, the processors, and the end users accumulate relatively large amounts of trimmed materials or residual materials which cannot be completely recycled to the production process or to further processing. Since plastics are in some cases also combined with other materials, such as plastics of different types, paper, board, metal, and/or printing inks, to give laminated structures, such recycling is especially difficult. Such trimmed materials or residual materials, which are commonly also referred to as potential recycling material, must be collected and then be separated into materials of the same type by expensive methods, which in practice cannot always be performed completely and cannot be carried out routinely in fully automatic plants.

SUMMARY OF THE INVENTION

It is the object of the present invention to provide a laminated material which has outstanding adhesive properties between the layers but, after its intended use in industry, for example, in the packaging sector or otherwise, can be separated into its individual components by simple and rapid means.

It is further an object to provide a process for delaminating the laminated material.

In accordance with the foregoing objectives there is provided a laminate material which has a latent inherent delamination potential, comprising:
a) at least one layer comprising a thermoplastic, and
b) at least one release layer comprising a steam-soluble, water-soluble, or water-dispersible organic material,
wherein layer a) is joined directly on at least one side, with the release layer b).

In accordance with another objective there is provided a process for delaminating the laminated material which comprises the steps of
i) chopping said laminate material into small flakes (chips), and
ii) treating said flakes with water or steam.

Further objects, features, and advantages of the present invention will become apparent from the detailed description of preferred embodiments that follows.

BRIEF DESCRIPTION OF THE DRAWINGS

The FIGURE shows a side view of a vertical section through a laminate which, for example, can be used for an embossing film.

DETAILED DESCRIPTION OF THE PREFERRED EMBODIMENTS

The laminated materials according to the invention, are generally used as packaging materials and may contain, for example, further layers of plastics of different types, paper, board, or paper-like materials, such as roughened plastics or opaque plastics. It is also possible to combine the layer of the thermoplastic with one or more further functional layers which can also be applied by coating, for example, release layers, decorative layers, metal layers, or metal layers which have been applied by metallizing.

The laminated materials according to the invention have a latent inherent delamination potential which is due to the release layer being joined directly to the layer of the thermoplastic. A latent inherent delamination potential means that the laminated material is cleavable into its individual constituents, wherein the delamination potential is present as a material property but indirectly instead of directly, i.e., it must first be activated in an appropriate manner. Without the appropriate activation, the individual layers of the laminated material are firmly bonded to one another and fulfill their intended purpose, i.e., as packaging materials, decorative materials, embossing films, transfer films, or the like. That is, the unactivated layers act like other laminate compositions which have no latent inherent delamination potential.

The thermoplastic can be any known in the art, and is preferably selected from: polyvinyl chloride; polyolefins, such as high or low density polyethylene, polypropylene, copolymers of ethylene and propylene, or mixtures thereof; polyesters, such as polyethylene terephthalate, polytetramethylene terephthalate, polyethylene isophthalate, or polyethylene naphthalate; polystyrene and substituted polystyrenes; polyamides, such as polyhexamethyleneadipamide, poly-epsilon-caprolactam, or polyhexamethylenesebacamide; polyphenylene sulfides or the like; or copolymers or mixtures thereof. Polyester is preferred, with polyethylene terephthalate being particularly preferred.

A release layer can be arranged on one or both sides of the layer comprising one or more of the thermoplastics. The release layer is expediently applied from aqueous solution or dispersion. The thickness of the release layer can be adjusted in the range between about 0.001 and 5.0 $\mu$m, more preferably in the range from 0.01 to 2.5 $\mu$m, and most preferably from 0.02 to 0.5 $\mu$m.

The release layer may be comprised of any material which imparts to the laminate the desired latent inherent delamination potential. Specifically, the water-soluble or water-dispersible organic materials of the release layer may be polymeric or monomeric compounds. Polyvinyl acetate, which is hydrolyzed to an extent of 90% or more; polyvinylpyrrolidone; copolymers of ethylene with hydrolyzed polyvinyl acetate; or copolycondensates of isophthalic acid and sulfoisophthalic acid, in particular 5-sulfoisophthalic acid, with ethylene glycol are examples of preferred water soluble polymers. Water-dispersible polyurethanes or copolymers of acrylates and methacrylates can also advantageously be used. Monomeric sodium oleate has also proved suitable.

A copolycondensate of 60 to 90 mol % of isophthalic acid and 10 to 40 mol % of sulfoisophthalic acid with ethylene glycol is preferred because this copolycondensate has good adhesive properties with further coatings, functional layers, and paper, and is also readily water-soluble.

The process for carrying out the delamination of the laminated materials comprises chopping the material into small flakes of a size sufficient to enable satisfactory handling and then treating the flakes with water. Preferably, the chopped material is introduced into a container which is equipped with a stirrer which operates in the turbulent flow range and generates the mechanical shearing forces required for separation. Water is present in the container and acts as a solvent and/or the saturated steam produced by heating the water swells the functional water-soluble release layer, which is arranged in the laminated material on at least one side of the thermoplastic layer. Separation starts from the edges, and the mechanical stress produced by the stirrer leads to a separation at the cleavage planes desired as a result of the specific arrangements of the release layers. The delamination process can be further accelerated by heating the water bath or by adding specific surfactants, enzymes or, if required, by means of alkalines and acids. Supporting the mechanical stirrer by additional pneumatic fluidization of the chopped material increases the efficiency of the delamination process.

The solids are isolated from the heterogeneous system of water and solid flakes, said system comparable with a coarse suspension, and, if possible, are separated simultaneously. Any separation method known in the art is acceptable. In particular, by utilizing the specific gravity and/or the surface properties of the individual layers of the laminate, in the form of the individual flakes after delamination, it is possible to use existing floatation, sedimentation, or decanting and filtration methods. It is also possible to separate materials of the same specific gravity, for example PVC and PET. A further classification of the types of material can, if required, be effected with the aid of air classification. This may simultaneously include the necessary drying of the various material flakes in order to make them free-flowing, pourable, and meterable.

The individual materials recovered by the process according to the invention can be used specifically and conveniently for further production or application processes.

The invention is illustrated in further detail below by way of an example, with reference to a drawing, but without being restricted to the embodiment described specifically. The FIGURE illustrates a typical laminate according to the invention which can be delaminated according to the process of the invention.

The FIGURE shows a possible use of the delaminable film according to the invention. Here, this film is used as a base 1,2,3 for an embossing film (1,2,3,4,5,6). After fastening the embossing film on a substrate via adhesive layer 6, the base 1,2,3 is removed and can be used for recycling.

The laminate comprises a substrate film 1 and the release layer 2, which is arranged on one side thereof and consists of water-soluble material. A further delamination layer 3 which consists of anti-adhesive, in particular, siliconized material and is usually necessary in order, for example, to stamp decorative layers onto a substrate, is arranged on the release layer 2. A primer 4 and a decorative layer 5, which may be a colored layer, a metallization, or a printed image, in particular a decorative wood print, is applied to the delamination layer 3. In the FIGURE, an adhesive layer 6 which, in particular, may contain a heat-sensitive adhesive and with the aid of which the decorative layer 5 with the primer 4 can be fastened by stamping onto a substrate which is not shown, is present on the free surface of the decorative layer 5.

What is claimed is:

1. A laminate material which has a latent inherent delamination potential, comprising:
   a) at least one layer comprising a thermoplastic,
   b) at least one release layer comprising a water-soluble polymer which is a copolycondensate of isophthalic acid and sulfophthalic acid with ethylene glycol,
   wherein said layer a) is joined directly on at least one side, with said release layer b),
   c) at least one additional layer comprising a thermoplastic other than that used in said layer a) or paper, and
   d) a functional layer selected from the group consisting of a release layer other than used as b), decorative, metal, and metallized layers.

2. A laminate as claimed in claim 1, wherein said additional layer is selected from the group consisting of roughened plastic and opaque plastic.

3. A laminate as claimed in claim 1, wherein said functional layer comprises decorative wood print.

4. A laminate as claimed in claim 1, wherein said thermoplastic is selected from at least one thermoplastic of the group consisting of polyvinyl chlorides, polyolefins, polyesters, polyamides, and polyphenylene sulfides.

5. A laminate as claimed in claim 4, wherein said thermoplastic is a polyolefin selected from at least one polyolefin of the group consisting of high density polyethylene, low density polyethylene, and polypropylene.

6. A laminate as claimed in claim 4, wherein said thermoplastic is a polyester selected from at least one polyester of the group consisting of polyethylene terephthalate, polytetramethylene terephthalate, polyethylene isophthalate, and polyethylene naphthalate.

7. A laminate as claimed in claim 6, wherein said polyester is polyethylene terephthalate.

8. A laminate as claimed in claim 4, wherein said thermoplastic is a polyamide selected from at least one polyamide of the group consisting of polyhexamethyleneadipamide, polyepsilon-caprolactam, and polyhexamethylenesebacamide.

9. A laminate as claimed in claim 1, wherein said thickness of said release layer is between about 0.001 and about 5.0 μm.

10. A laminate as claimed in claim 9, wherein said thickness is between about 0.02 and about 0.5 μm.

11. A laminate as claimed in claim 1, wherein said water-soluble polymer comprises a copolycondensate of 60 to 90 mol % of isophthalic acid and 10 to 40 mol % of sulfoisophthalic acid, based on the mol% of said acids, and ethylene glycol.

12. A laminate as claimed in claim 1, wherein said thermoplastic of layer a) is selected from the group consisting of polystyrene and substituted polystyrene.

13. A laminate as claimed in claim 1, wherein said thermoplastic of layer a) is a polyolefin selected from the group consisting of copolymers of ethylene and propylene.

14. A laminate as claimed in claim 1, wherein said release layer b) consists essentially of said polymer selected from a copolycondensate of isophthalic acid and sulfophthalic acid with ethylene glycol.

15. A laminate as claimed in claim 1, wherein said additional layer c) is a layer of cardboard.

16. A laminate as claimed in claim 1, wherein said functional layer d is a release layer other than used as b).

17. A laminate as claimed in claim 1, wherein said functional layer d is a metal layer.

18. A laminate material which has a latent inherent delamination potential, comprising:
 a) at least one layer comprising a thermoplastic,
 b) at least one release layer comprising a water-dispersible organic material selected from the group consisting of polyurethanes and copolymers of acrylates and methacrylates,
 wherein said layer a) is joined directly on at least one side, with said release layer b),
 c) at least one additional layer comprising a thermoplastic other than that used in said layer a) or paper, and
 d) a functional layer selected from the group consisting of a release layer other than used as b), decorative, metal, and metallized layers.

19. A laminate material which has a latent inherent delamination potential, comprising:
 a) at least one layer comprising a thermoplastic,
 b) at least one release layer consisting essentially of sodium oleate,
 wherein said layer a) is joined directly on at least one side, with said release layer b),
 c) at least one additional layer comprising a thermoplastic other than that used in said layer a) or paper, and
 d) a functional layer selected from the group consisting of a release layer other than used as b), decorative, metal, and metallized layers.

* * * * *